United States Patent (12)
Yea et al.

(10) Patent No.: US 11,451,802 B2
(45) Date of Patent: Sep. 20, 2022

(54) METHOD AND APPARATUS FOR POINT CLOUD CODING

(71) Applicant: Tencent America LLC, Palo Alto, CA (US)

(72) Inventors: Sehoon Yea, Palo Alto, CA (US); Wen Gao, West Windsor, NJ (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/211,536

(22) Filed: Mar. 24, 2021

(65) Prior Publication Data

US 2021/0329270 A1 Oct. 21, 2021

Related U.S. Application Data

(60) Provisional application No. 63/011,913, filed on Apr. 17, 2020.

(51) Int. Cl.
*H04N 19/186* (2014.01)
*H04N 19/184* (2014.01)
*H04N 19/174* (2014.01)
*H04N 19/172* (2014.01)
*H04N 19/44* (2014.01)

(52) U.S. Cl.
CPC ......... *H04N 19/186* (2014.11); *H04N 19/172* (2014.11); *H04N 19/174* (2014.11); *H04N 19/184* (2014.11); *H04N 19/44* (2014.11)

(58) Field of Classification Search
CPC .............. H04N 19/186; H04N 19/172
See application file for complete search history.

(56) References Cited

U.S. PATENT DOCUMENTS

| 2005/0007497 | A1 | 1/2005 | Huang et al. |
| 2014/0161188 | A1 | 6/2014 | Zhang et al. |
| 2017/0366818 | A1* | 12/2017 | Zhang ................. H04N 19/159 |
| 2019/0156519 | A1* | 5/2019 | Mammou ............ H04N 19/172 |

OTHER PUBLICATIONS

International Search Report and Written Opinion dated Jul. 16, 2021 in PCT/US 21/26888.

* cited by examiner

*Primary Examiner* — Jerry T Jean Baptiste
(74) *Attorney, Agent, or Firm* — ArentFox Schiff LLP

(57) ABSTRACT

In a method of point cloud geometry decoding in a point cloud decoder, chroma prediction residual information of a point in a set of points is received from a coded bitstream for a point cloud that includes the set of points. The chroma prediction residual information includes a Cb component and a Cr component. Further, a type of correlation between the Cb component and the Cr component of the chroma prediction residual information is determined by processing circuitry and from the coded bitstream for the point cloud. The chroma prediction residual information is decoded based on the type of the correlation between the Cb component and the Cr component of the chroma prediction residual information.

20 Claims, 13 Drawing Sheets

METHOD AND APPARATUS FOR POINT CLOUD CODING

INCORPORATION BY REFERENCE

This present application claims the benefit of priority to U.S. Provisional Application No. 63/011,913, "METHOD AND APPARATUS FOR JOINT CHROMA CHANNEL CODING OF POINT CLOUD ATTRIBUTES" filed on Apr. 17, 2020, which is incorporated by reference herein in its entirety.

TECHNICAL FIELD

The present disclosure describes embodiments generally related to point cloud coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. Point clouds can be used as a 3D representation of the world. A point cloud is a set of points in a 3D space, each with associated attributes, e.g. color, material properties, texture information, intensity attributes, reflectivity attributes, motion related attributes, modality attributes, and/or various other attributes. Such point clouds may include large amounts of data and may be costly and time-consuming to store and transmit.

SUMMARY

Aspects of the disclosure provide methods and apparatuses for processing point cloud data. According to an aspect of the disclosure, a method of point cloud geometry decoding in a point cloud decoder is provided. In the method, chroma prediction residual information of a point in a set of points can be received from a coded bitstream for a point cloud that includes the set of points. The chroma prediction residual information can include a Cb component and a Cr component. Further, a type of correlation of the Cb component and the Cr component of the chroma prediction residual information can be determined by processing circuitry and from the coded bitstream for the point cloud. The chroma prediction residual information can be decoded based on the type of the correlation of the Cb component and the Cr component of the chroma prediction residual information.

In an example, in order to decode the chroma prediction residual information, the Cb component of the chroma prediction residual information and the Cb component minus the Cr component of the chroma prediction residual information can be decoded based on the type of the correlation of the Cb component and the Cr component being positive.

In another example, in order to decode the chroma prediction residual information, the Cb component of the chroma prediction residual information and the Cb component plus the Cr component of the chroma prediction residual information can be decoded based on the type of the correlation of the Cb component and the Cr component being negative.

In yet another example, in order to decode the chroma prediction residual information, the Cb component of the chroma prediction residual information and the Cr component of the chroma prediction residual information can be decoded based on no indicated correlation between the Cb component and the Cr component.

In some embodiments, the type of the correlation of the Cb component and the Cr component of the chroma prediction residual information can be determined to be positive based on a first number of residual points from one of a coded region, a previous level of detail (LOD), or N nearest-neighboring points of the point being positively correlated. In some embodiments, the type of the correlation of the Cb component and the Cr component of the chroma prediction residual information can be determined to be negative based on a second number of residual points from the one of the coded region, the previous LOD, or the N nearest-neighboring points of the point being negatively correlated.

In some embodiments, the coded region can include at least one of a frame, a video sequence, a group of pictures (GOP), a picture, a slice, or a tile.

In some embodiments, the N can be a positive integer that is equal to 3 or 4.

In the method, the coded bitstream can further include signaling information that is indicative of the type of the correlation of the Cb component and the Cr component of the chroma prediction residual information. In an example, the signaling information can indicate the type of the correlation of the Cb component and the Cr component of the chroma prediction residual information is positive based on a first number of residual points from one of a coded region, a previous level of detail (LOD), a LOD to which the point belongs, and N nearest-neighboring points of the point being positively correlated. In another example, the signaling information can indicate the type of the correlation of the Cb component and the Cr component of the chroma prediction residual information is negative based on a second number of residual points from the one of the coded region, the previous LOD, the LOD to which the point belongs, and the N nearest-neighboring points of the point being negatively correlated.

According to an aspect of the disclosure, a method of point cloud geometry decoding in a point cloud decoder is provided. In the method, first signaling information can be received from a coded bitstream for a point cloud that includes a set of points. The first signaling information can indicate that first chroma prediction residual information and second chroma prediction residual information of a point in the set of points are decoded based on a type of correlation of the first chroma prediction residual information and the second chroma prediction residual information. The coded bitstream can include the first chroma prediction residual information and the second chroma prediction residual information. The type of the correlation between the first chroma prediction residual information and the second chroma prediction residual information can be determined based on the first signaling information. Further, first chroma information and second chroma information can be reconstructed based on the first chroma prediction residual information, the second chroma prediction residual information, and the type of the correlation between the first chroma prediction residual information and the second chroma prediction residual information.

In some embodiments, second signaling information can be determined based on the first signaling information being a first value. The second signaling information can indicate the type of the correlation between the first chroma prediction residual information and the second chroma prediction residual information are determined by third signaling information. The third signaling information can be determined based on the second signaling information being the first value. The type of the correlation between the first chroma prediction residual information and the second chroma prediction residual information can be determined based on the third signaling information.

In an example, the type of the correlation between the first chroma prediction residual information and the second chroma prediction residual information can be determined to be negative based on the third signaling information being the first value. In another example, the type of the correlation between the first chroma prediction residual information and the second chroma prediction residual information can be determined to be positive based on the third signaling information being a second value.

In the method, the first chroma information can be reconstructed by performing a first inverse-quantization process on the first chroma prediction residual information. In addition, in response to the first signaling information being a first value, the second chroma information that includes a first portion and a second portion can be reconstructed. The first portion can be obtained by performing a second inverse-quantization process on the second chroma prediction residual information, and the second portion can be obtained by multiplying the reconstructed first chroma information and the type of the correlation between the first chroma prediction residual information and the second chroma prediction residual information.

In some embodiments, the first chroma information can be reconstructed by performing a first inverse-quantization process on the first chroma prediction residual information. In response to the first signaling information being a second value, the second chroma information can be reconstructed by performing a second inverse-quantization process on the second chroma prediction residual information.

In some embodiments, the first chroma prediction residual information and the second chroma prediction residual information can be correlated in a first order relation with zero offsets.

In some examples, the apparatus for processing the point cloud data includes receiving circuitry and processing circuitry that are configured to perform one or more of the methods described above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Advanced 3D representations of the world are enabling more immersive forms of interaction and communication, and also allow machines to understand, interpret and navigate our world. 3D point clouds have emerged as an enabling representation of such information. A number of application cases associated with point cloud data have been identified, and corresponding requirements for point cloud representation and compression have been developed. For example, a 3D point cloud can be used in autonomous driving for object detection and localization. The 3D point cloud can be also used in geographic information systems (GIS) for mapping, and used in cultural heritage to visualize and archive cultural heritage objects and collections.

A point cloud generally may refer to a set of points in a 3D space, each with associated attributes. The attributes can include color, material properties, texture information, intensity attributes, reflectivity attributes, motion related attributes, modality attributes, and/or various other attributes. Point clouds can be used to reconstruct an object or a scene as a composition of such points. The points can be captured using multiple cameras, depth sensors and/or Lidar in various setups and may be made up of thousands up to billions of points in order to realistically represent reconstructed scenes.

Compression technologies can reduce the amount of data required to represent a point cloud for faster transmission or reduction of storage. As such, technologies are needed for lossy compression of point clouds for use in real-time communications and six Degrees of Freedom (6 DoF) virtual reality. In addition, technology is sought for lossless point cloud compression in the context of dynamic mapping for autonomous driving and cultural heritage applications, and the like. Thus, ISO/IEC MPEG (JTC 1/SC 29/WG 11) has started working on a standard to address compression of geometry and attributes such as colors and reflectance, scalable/progressive coding, coding of sequences of point clouds captured over time, and random access to subsets of the point cloud.

Figure 1:
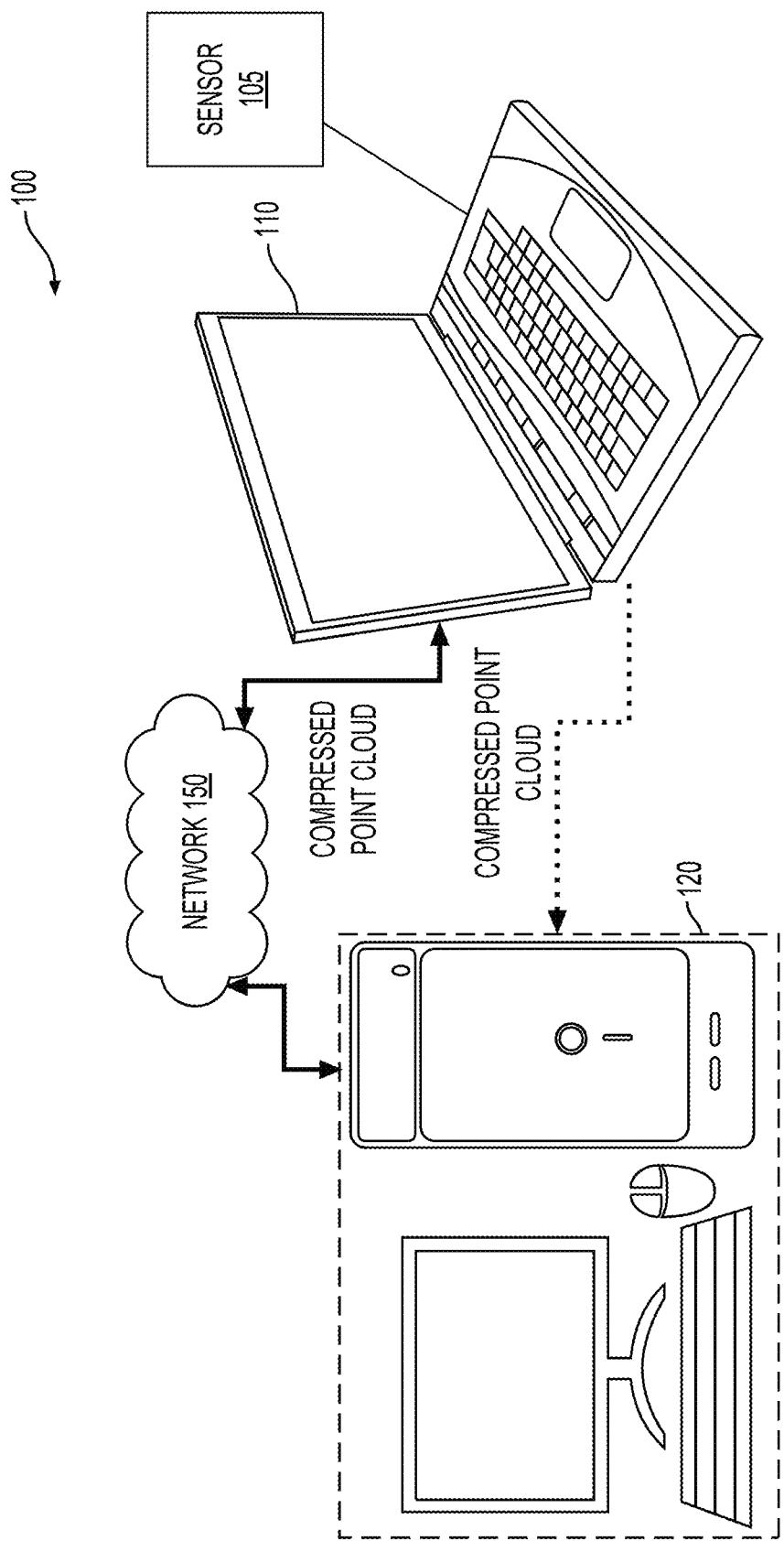
FIG. 1 is a schematic illustration of a simplified block diagram of a communication system in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit a compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
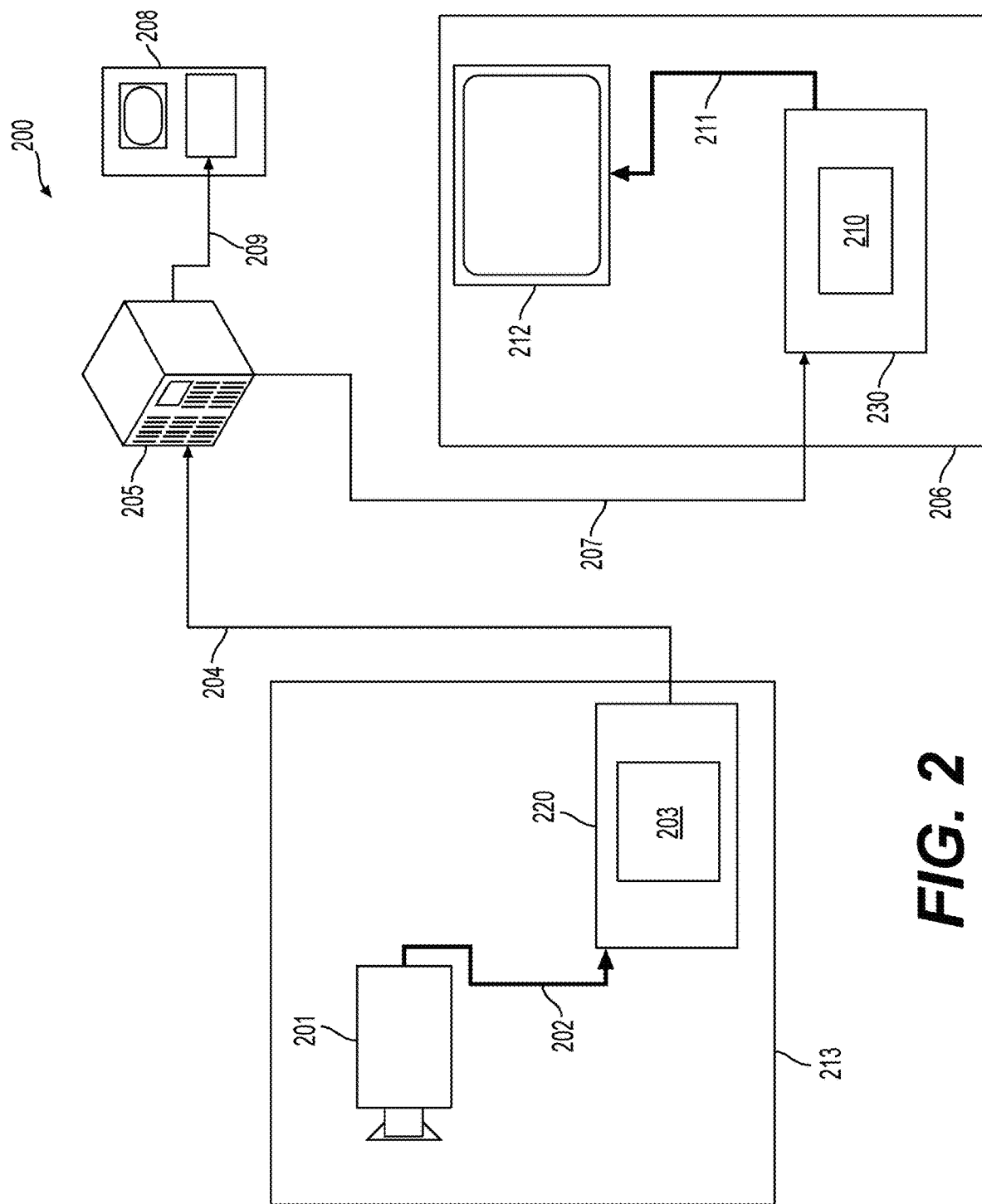
FIG. 2 is a schematic illustration of a simplified block diagram of a streaming system in accordance with an embodiment.

FIG. 2 illustrates a simplified block diagram of a streaming system (200) in accordance with an embodiment. The FIG. 2 example is an application for the disclosed subject matter for a point cloud. The disclosed subject matter can be equally applicable to other point cloud enabled applications, such as, a 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
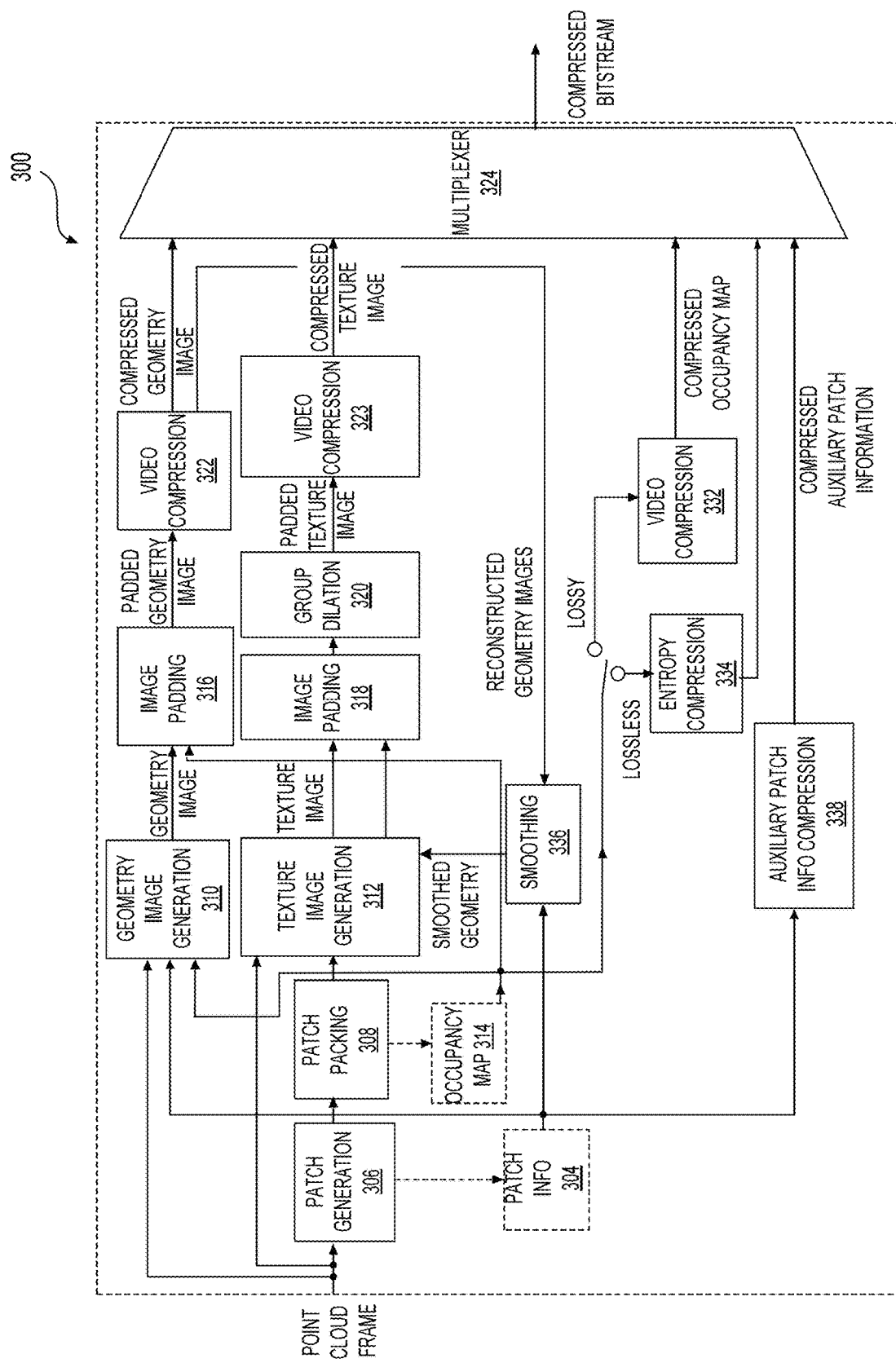
FIG. 3 shows a block diagram of an encoder for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into an image-based representation along with some meta data (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

A patch generally may refer to a contiguous subset of the surface described by the point cloud. In an example, a patch includes points with surface normal vectors that deviate from one another less than a threshold amount. The patch generation module (306) segments a point cloud into a set of patches, which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

The patch info module (304) can collect the patch information that indicates sizes and shapes of the patches. In some examples, the patch information can be packed into an image frame and then encoded by the auxiliary patch info compression module (338) to generate the compressed auxiliary patch information.

The patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, a geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate and does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g., geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, and/or the compressed auxiliary patch information into a compressed bitstream.

Figure 4:
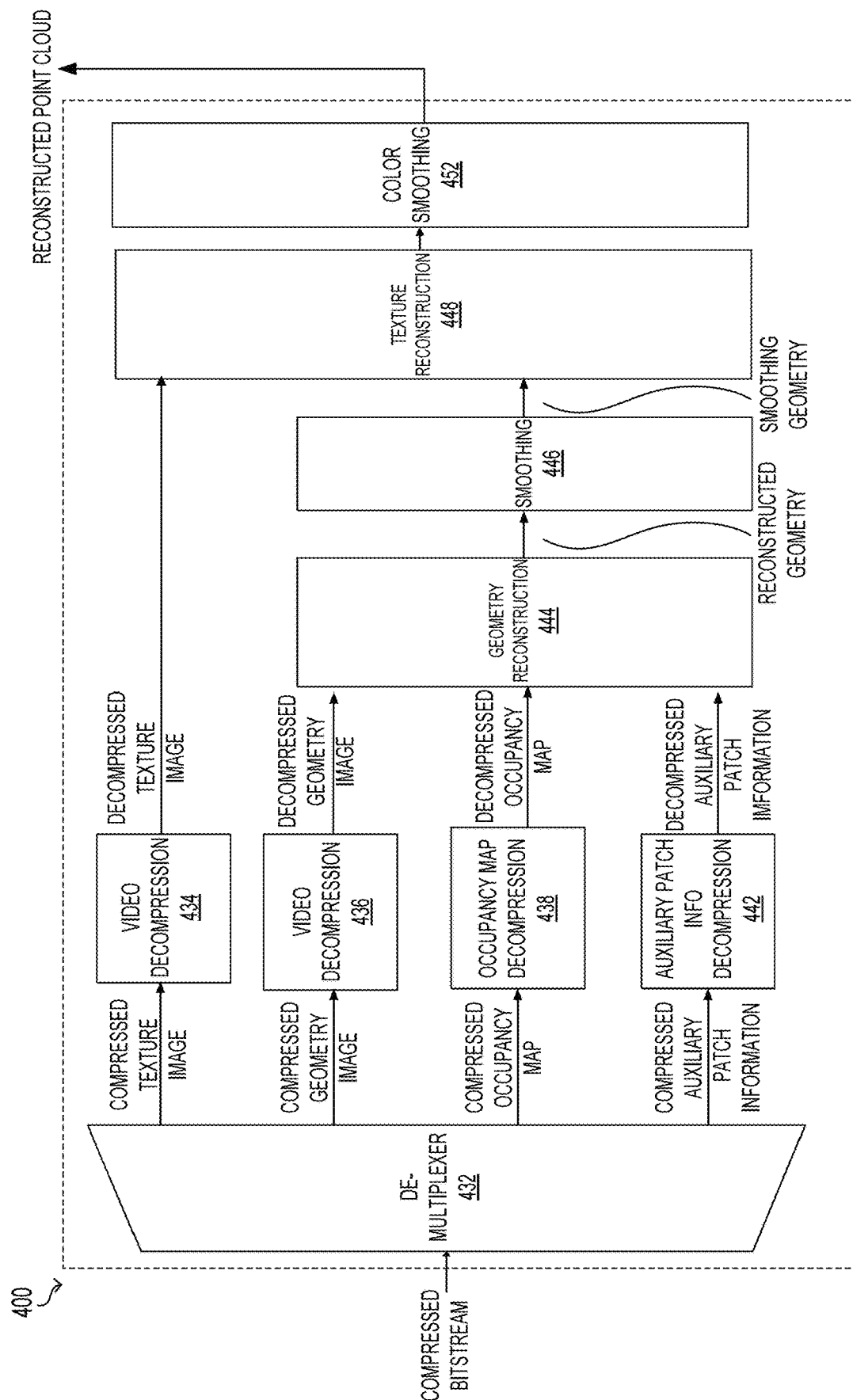
FIG. 4 shows a block diagram of a decoder for decoding a compressed bitstream corresponding to point cloud frames according to some embodiments.

FIG. 4 shows a block diagram of a V-PCC decoder (400) for decoding a compressed bitstream corresponding to point cloud frames, according to some embodiments. In some embodiments, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates a reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into a compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
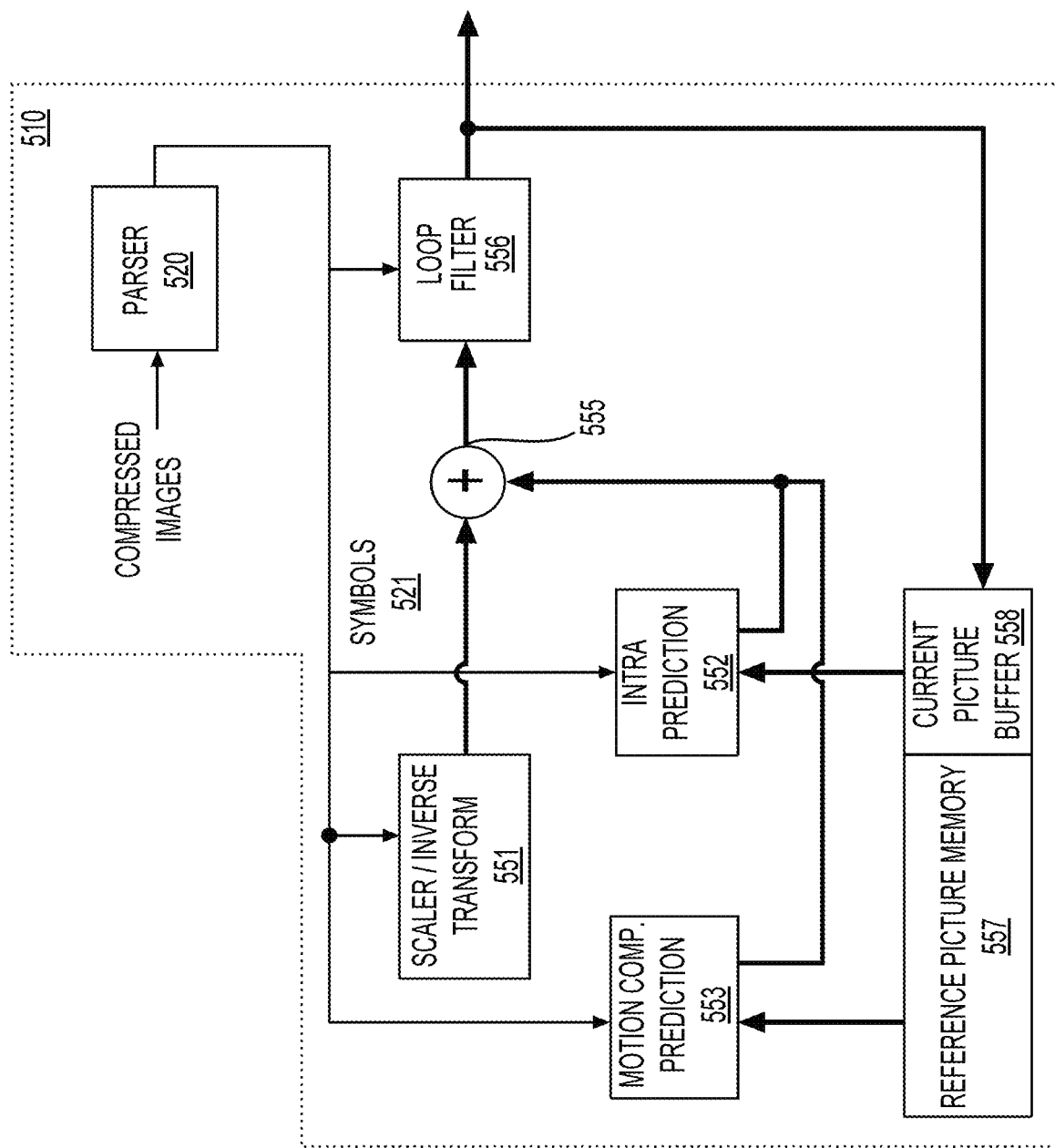
FIG. 5 is a schematic illustration of a simplified block diagram of a video decoder in accordance with an embodiment.

FIG. 5 shows a block diagram of a video decoder (510) according to an embodiment of the present disclosure. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (e.g., inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, a partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
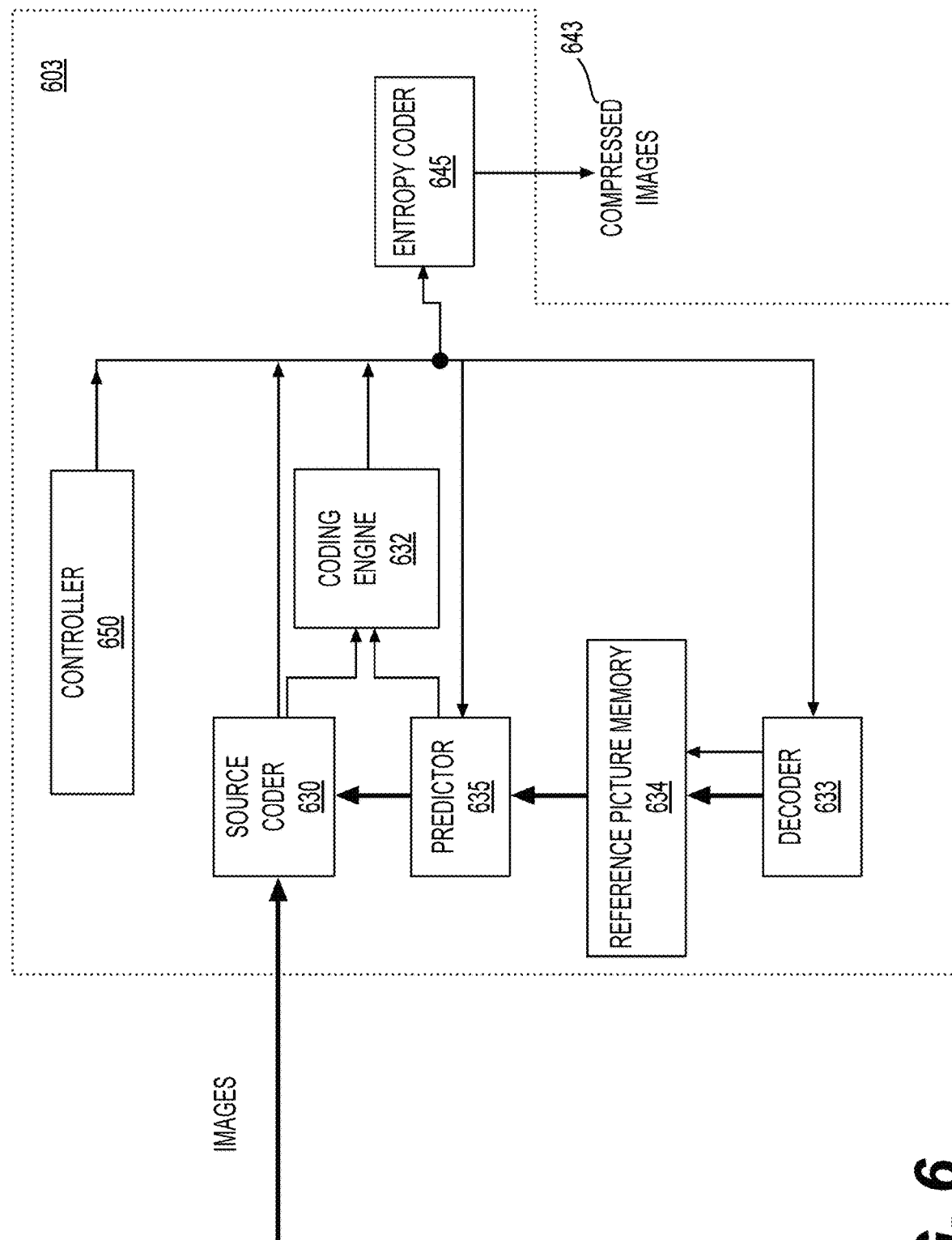
FIG. 6 is a schematic illustration of a simplified block diagram of a video encoder in accordance with an embodiment.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols to generate compressed images 643 according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (e.g., blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

The G-PCC model can separately compress the geometry information and the associated attributes such as color or reflectance. The geometry information, which is the 3D coordinates of the point clouds, can be coded by octree-decomposition of its occupancy information. On the other hand, the attribute information can be encoded by a DPCM-like technique which performs closed-loop prediction of LOD (Level-Of-Detail) data between different levels. The LOD information can be built in an identical manner at the encoder and the decoder based upon the decoded geometry information. Basically, the LOD can be built in such a way that more detailed information of the given point cloud can be obtained in a successive manner as more LOD is provided. When the sample-based prediction is performed for attribute coding, the nearest-neighbor based tree search can be leveraged to find neighboring samples to do a weighted prediction. The weight can be calculated as the inverse of the geometric distance of each of the neighboring samples.

Figure 7:
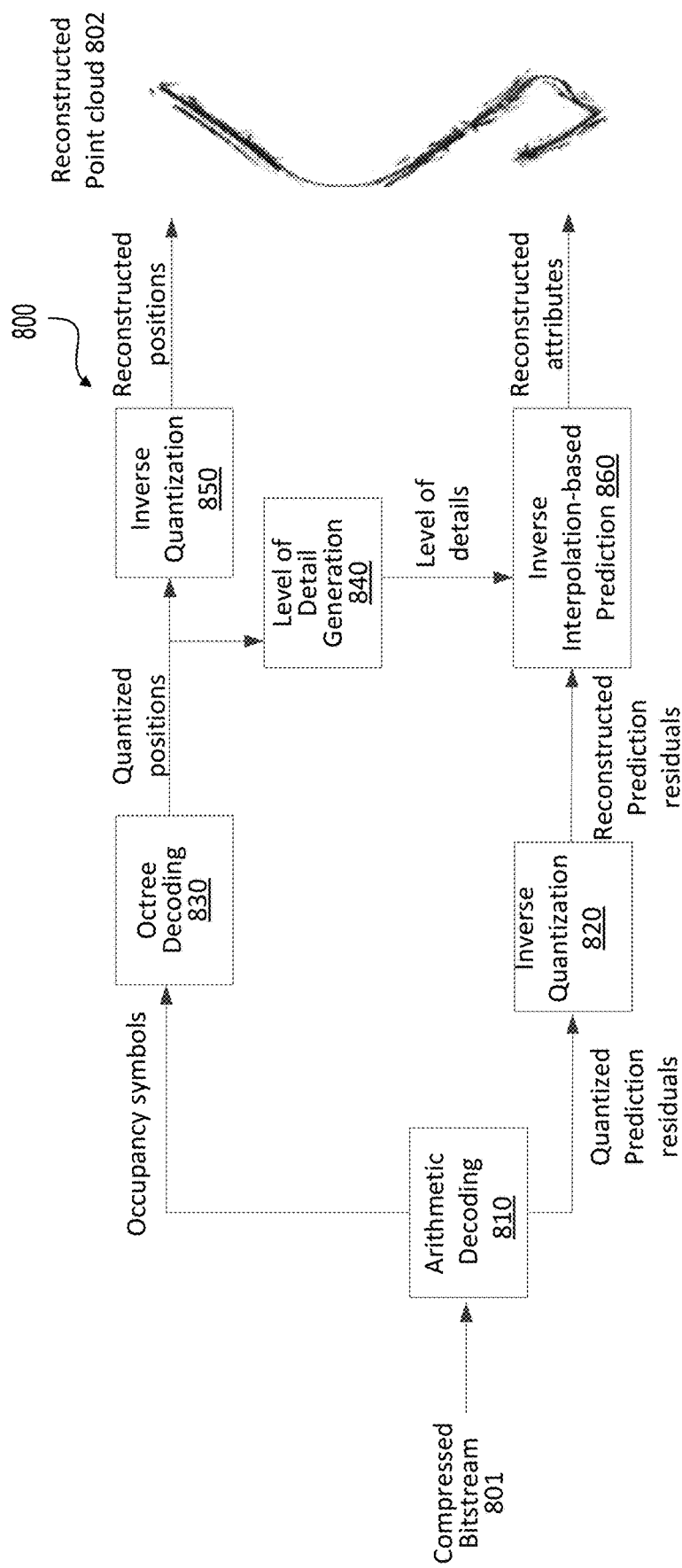
FIG. 7 shows a block diagram of a decoder for decoding a compressed bitstream corresponding to point cloud frames according to some embodiments.

FIG. 7 shows a block diagram of a G-PCC decoder (800) that is applied during a G-PCC decomposition process in accordance with an embodiment. The decoder (800) can be configured to receive a compressed bitstream and perform point cloud data decompression to decompress the bitstream to generate decoded point cloud data. In an embodiment, the decoder (800) can include an arithmetic decoding module (810), an inverse quantization module (820), an octree decoding module (830), an LOD generation module (840), an inverse quantization module (850), and an inverse interpolation-based prediction module (860).

As shown, a compressed bitstream (801) can be received at the arithmetic decoding module (810). The arithmetic decoding module (810) is configured to decode the compressed bitstream (801) to obtain quantized prediction residuals (if generated) and occupancy codes (or symbols) of a point cloud. The octree decoding module (830) is configured to generate quantized positions of points in the point cloud according to the occupancy codes. The inverse quantization module (850) is configured to generate reconstructed positions of the points in the point cloud based on the quantized positions provided by the octree decoding module (830).

The LOD generation module (840) is configured to reorganize the points into different LODs based on the reconstructed positions, and determine an LOD-based order. The inverse quantization module (820) is configured to generate reconstructed prediction residuals based on the quantized prediction residuals received from the arithmetic decoding module (810). The inverse interpolation-based prediction module (860) is configured to perform an attribute prediction process to generate reconstructed attributes of the points in the point cloud based on the reconstructed prediction residuals received from the inverse quantization module (820) and the LOD-based order received from the LOD generation module (840).

Further, the reconstructed attributes generated from the inverse interpolation-based prediction module (860) together with the reconstructed positions generated from the inverse quantization module (850) correspond to a decoded point cloud (or reconstructed point cloud) (802) that is output from the decoder (800) in one example.

Figure 8:
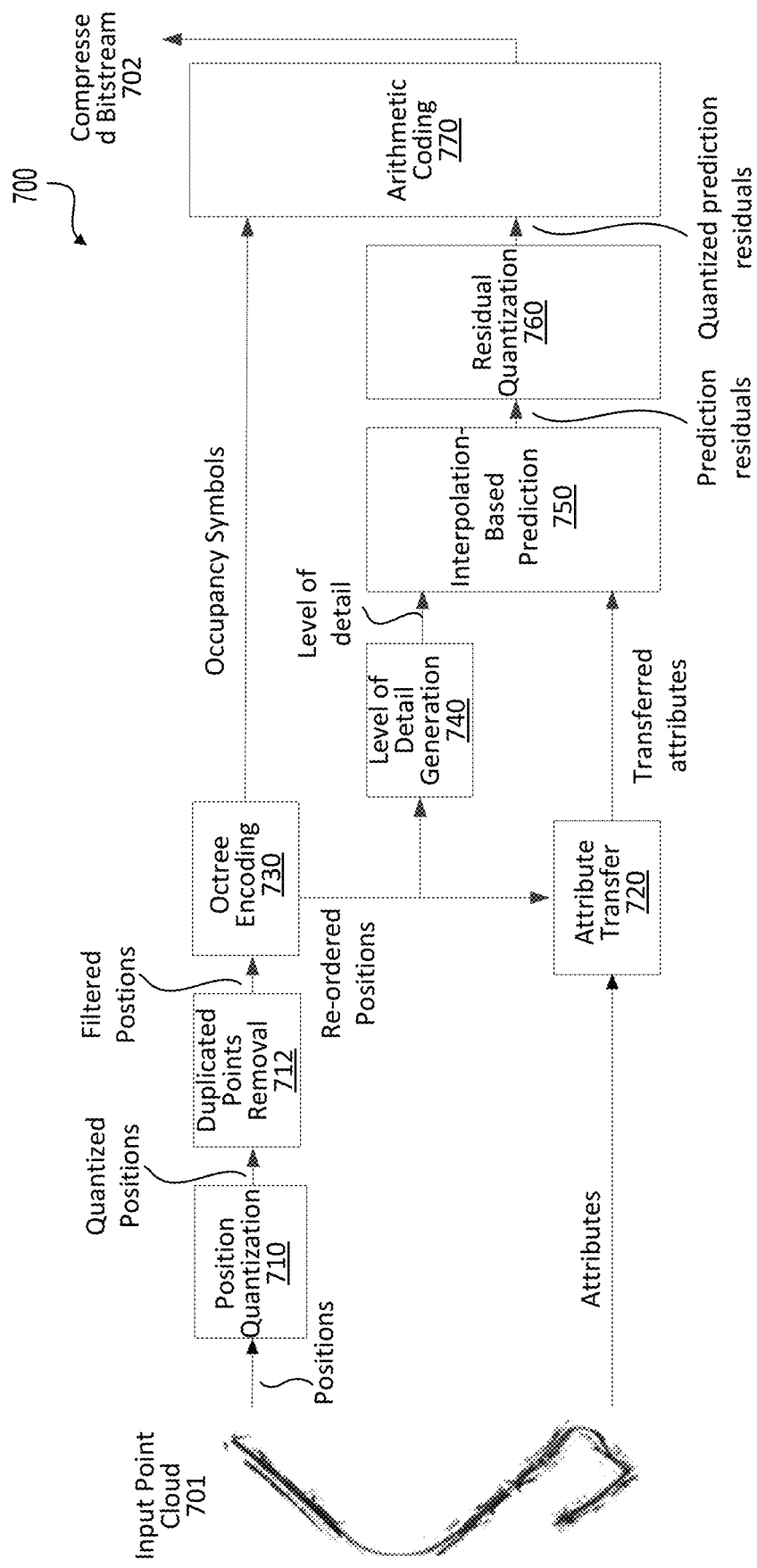
FIG. 8 shows a block diagram of an encoder for encoding point cloud frames, according to some embodiments.

FIG. 8 shows a block diagram of a G-PPC encoder (700) in accordance with an embodiment. The encoder (700) can be configured to receive point cloud data and compress the point cloud data to generate a bit stream carrying compressed point cloud data. In an embodiment, the encoder (700) can include a position quantization module (710), a duplicated points removal module (712), an octree encoding module (730), an attribute transfer module (720), a level of detail (LOD) generation module (740), an interpolation-based prediction module (750), a residual quantization module (760), and an arithmetic coding module (770).

As shown, an input point cloud (701) can be received at the encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes (or symbols) that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the interpolation-based prediction module (750). The LOD generation module (740) is configured to operate on the re-ordered points output from the octree encoding module (730), and re-organize the points into different LODs. LOD information is supplied to the interpolation-based prediction module (750).

The interpolation-based prediction module (750) processes the points according to an LOD-based order indicated by the LOD information from the LOD generation module (740) and the transferred attributes received from the attribute transfer module (720), and generates prediction residuals. The residual quantization module (760) is configured to receive the prediction residuals from the interpolation-based prediction module (750), and perform quantization to generate quantized prediction residuals. The quantized prediction residuals are provided to the arithmetic coding module (770). The arithmetic coding module (770) is configured to receive the occupancy codes from the octree encoding module (730), the candidate indices (if used), the quantized prediction residuals from the interpolation-based prediction module (750), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

It is noted that the interpolation-based prediction module (750) and the inverse interpolation-based prediction module (860) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

Figure 9:
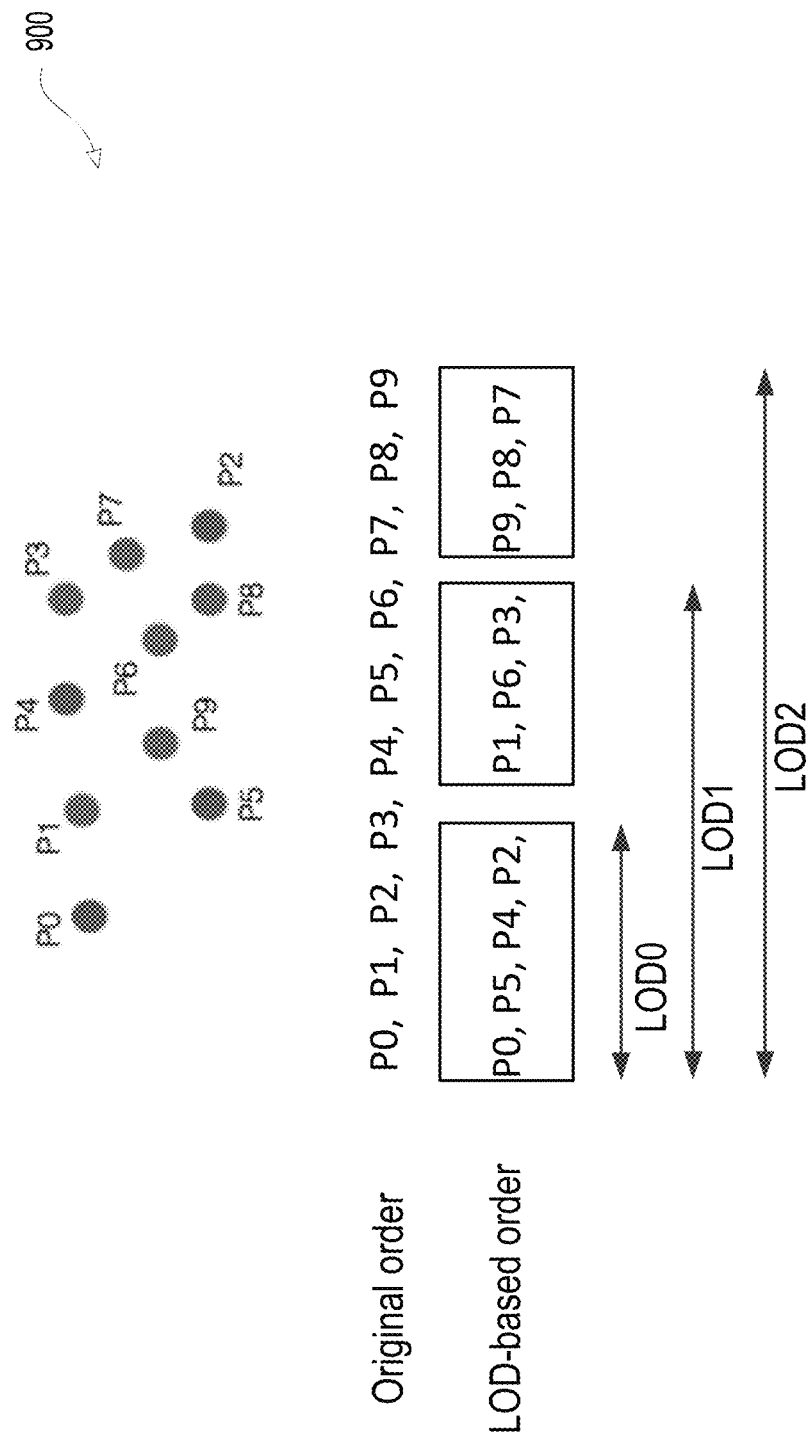
FIG. 9 shows a diagram illustrating a level of detail (LOD) generation process in graphic-based point cloud compression (G-PCC) according to some embodiments of the disclosure.
Figure 10:
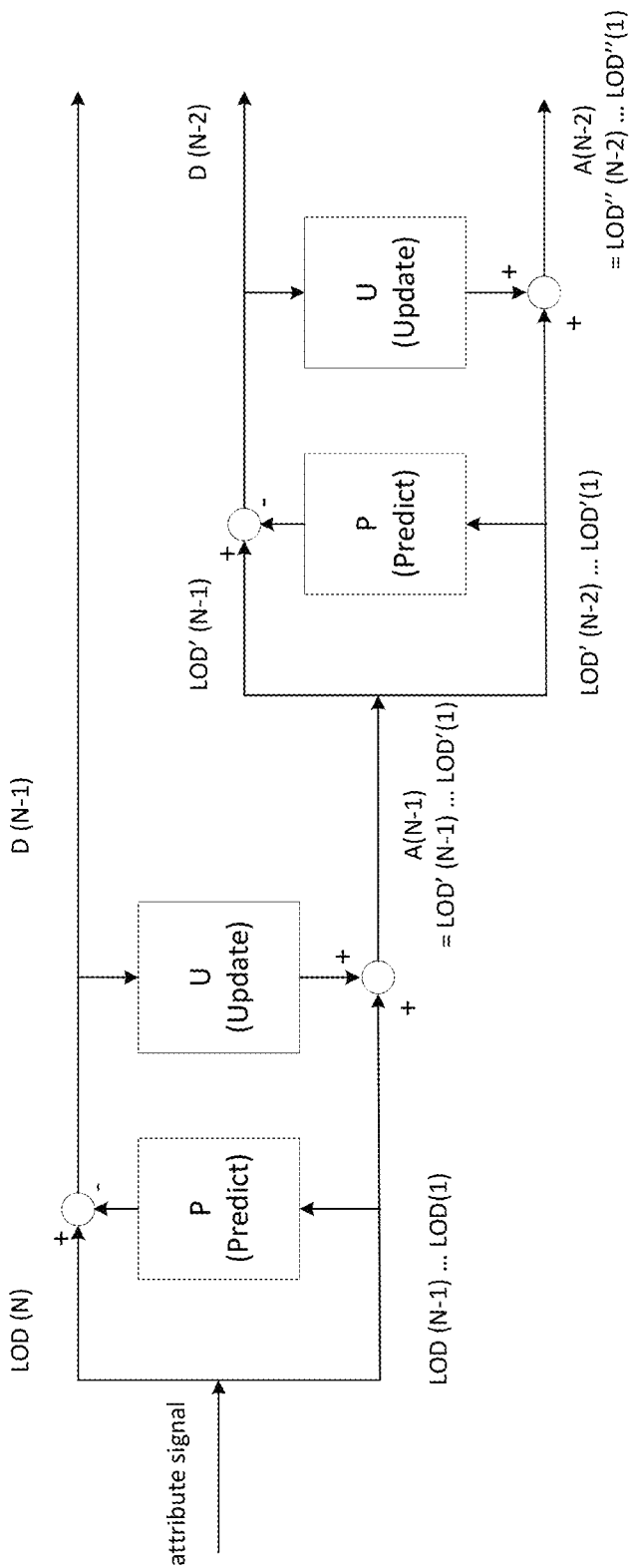
FIG. 10 shows a diagram illustrating a lifting-transform for attribute coding in G-PCC according to some embodiments of the disclosure.

In current G-PCC attributes coding based on a predicting transform, LOD (Level of Detail) of each 3D points can be generated based on a distance of each points. The attributes value of 3D points in each LOD can be encoded by applying prediction in a LOD-based order. FIG. 9 shows a LOD generation process 900 in G-PCC. As shown in FIG. 9, points P0, P5, P4, and P2 can be in LOD0. Points P1, P6, and P3 can be in LOD1. P9, P8, and P7 can be in LOD2. An attribute value of P2 can be predicted by calculating a distance based weighted average value of P0, P5, and P4 which are encoded or decoded prior to P2.

In current G-PCC attribute coding, in an embodiment, a variability of neighborhood of a current point (e.g., P2) can be computed to check how different neighbor values are and if the variability is lower than a threshold. If the threshold is lower than the threshold, the distance-based weighted average prediction can be conducted as follows.

Attribute values $(a_{i,i \in 0 \ldots k-1}$ can be predicted by using a linear interpolation process based on the distances of the nearest neighbors of the current point i. Let $\aleph$ be the set of the k-nearest neighbors of the current point i and let $(\tilde{a}_j)_{j \in \aleph_i}$ be decoded/reconstructed attribute values of the k-nearest neighbors, and $(\delta_j)_{j \in \aleph_i}$ be distances of the k-nearest neighbors to the current point i. The predicted attribute value $\hat{a}_i$ for the current point i can then be given by equation (1) as follows:

$$\hat{a}_i = \text{Round}\left(\frac{1}{k}\sum_{j \in \aleph_i} \frac{\frac{1}{\delta_j^2}}{\sum_{j \in \aleph} \frac{1}{\delta_j^2}} \tilde{a}_j\right) \quad \text{(Eq. 1)}$$

It should be noted that the geometric locations of all the point clouds can be available when attributes are coded. In addition, the neighboring points together with reconstructed attribute values of the neighboring points can be available both at the encoder and the decoder, where a KD-Tree structure can be used to facilitate the nearest-neighbor search for each point in an identical manner.

In another embodiment, if the variability is higher than the threshold, a rate-distortion optimized predictor selection can be performed. Multiple predictor candidates can be created based on the result of neighbor point search in generating LOD. For example, when the attribute value of P2 is encoded by using prediction, a distance based weighted average value of P0, P5 and P4 can be set to predictor index equal to 0. Then, the value of nearest neighbor point P4 can be set to predictor index equal to 1. Moreover, the value of next nearest neighbor point P5 and P0 can be set to predictor index equal to 2 and 3 respectively, which can be shown in Table 1. After creating predictor candidates, best predictor can be selected by applying a rate-distortion optimization procedure and then, selected predictor index can be arithmetically encoded.

TABLE 1

Sample of predictor candidate for attributes coding

| Predictor index | Predicted value |
|---|---|
| 0 | average |
| 1 | P4 ($1^{st}$ nearest point) |
| 2 | P5 ($2^{nd}$ nearest point) |
| 3 | P0 ($3^{rd}$ nearest point) |

The maximum number of predictor candidate (also referred to as Max NumCand) can be defined and further be encoded into attributes header. In current G-PCC attributes coding, Max NumCand can be set to equal to the number of nearest neighbors in prediction plus one (e.g., numberOfNearestNeighborsInPrediction+1), and can further be used in encoding and decoding predictor index with truncated unary binarization.

In current attribute coding in G-PCC based on a lifting transform, the lifting transform can be built on top of the predicting transform that is described above. The main difference between the prediction scheme (or predicting transform) and the lifting scheme (or lifting transform) is an introduction of an update operator.

FIG. 9 shows an exemplary architecture of P/U (Prediction/Update)-lifting in G-PCC. In order to facilitate the prediction and update steps in lifting transform, input attribute signal can be split into two sets of high-correlation signals at each stage of decomposition. In the lifting scheme in G-PCC, the splitting can be performed by leveraging the LOD structure mentioned above where a high-correlation is expected among levels and each level is constructed by nearest-neighbor search to organize the non-uniform point clouds into a structured data. Further, a P/U decomposition step at each level (e.g., N) can result in a detail signal (e.g., D(N−1) and an approximation signal (e.g. A(N−1)). As shown in FIG. 9, for example, the input attribute signal including LOD(N), LOD(N−1) . . . LOD(1) can be split into LOD(N) and LOD (N−1) . . . LOD(1). LOD(N−1) . . . LOD(1), which may be an even sample set, can be used as a predictor for LOD(N). LOD(N) may be an odd sample set. Then a difference signal (or detail signal) D(N−1) can be generated based on a difference between LOD(N) and an LOD(N) predictor. The difference signal D(N−1) may be a high-pass signal. Further, a low-pass signal (or approximation signal) A(N−1) can be generated after the updating step as an approximation signal of LOD(N−1) . . . LOD(1).

The detail signal D(N−1) and the approximation signal A(N−1) can further be decomposed into D(N−2) and A(N−2). The splitting step can be repeatedly applied until the base layer approximation signal A(1) is obtained.

Consequently, instead of coding the input attribute signal itself which can include LOD(N), . . . , and LOD(1), the lift scheme can code D(N−1), D(N−2), . . . , D(1), A(1). It should be noted that the application of efficient P/U steps can often lead to sparse subbands "coefficients" in D(N−1), . . . , D(1). Thus, the application of efficient P/U steps can provide a transform coding gain advantage.

It should be noted, in current attribute coding in G-PCC, only the distance-based weighted average prediction described above in the predicting transform is applied in the prediction step during the lifting transform.

For point cloud attributes such as color, significant redundancy can exist among channels. In order to improve coding efficiency, a color space conversion can be performed as a pre-/post-processing step. Even after such conversion, significant correlation can still exist among channels in the converted color-space. However, unlike in RGB-domain prediction or residual-prediction, the YCbCr-space counterpart usually employs first-order linear relationships. The color space conversion can require estimation and/or signaling of the scaling and offset parameters. In an exemplary conversion of RGB-to-YUV, the prediction of chroma residuals from the corresponding luma residual can be provided by equations (2) and (3) as follows:

$$U = a_u \times Y + b_u \quad \text{(Eq. 2)}$$

$$V = a_v \times Y + b_v \quad \text{(Eq. 3)}$$

where Y refers to the prediction residual of luma and U and V refer to the prediction residual of chroma.

In the present disclosure, methods for joint chroma channel coding of point cloud attributes are provided. The methods provided in the disclosure can efficiently perform inter-channel decorrelation for compression efficiency without the overhead of parameter estimation and coding, for example as compared to related examples that limit the inter-channel decorrelation only between the chroma signals. The methods provided herein pertain to the predicting transform and lifting transform in G-PCC that are described above. The methods can be applied to similar codecs designed for point clouds.

In order to de-correlate a multi-channel signal, a predictor can be applied. In the present disclosure, a predictor can be applied to predict residual signals of the channels so that a second order residual instead of original residuals can be quantized and entropy-coded. The present disclosure includes embodiments that are based on the observation that prediction residuals of Cb and Cr chroma channels can be correlated.

Embodiments of the present disclosure can be applied to both predicting transform and lifting transform in G-PCC. Since the detail subband coefficients (e.g., D (N−1)) are an output from the predict-step of the lifting transform, the detail subband coefficients can essentially be prediction residual signals and be similar among different color channels given an identical prediction strategy.

In the present disclosure, $Res_{Cb}$ and $Res_{Cr}$ can denote the prediction residual signals of Cb and Cr components (also referred to as the Cb component and the Cr component of chroma prediction residual information), respectively. One of the prediction residual signals and a combination of the prediction residual signals can be coded based on a correlation between the prediction residual symbols. In an embodiment, the $Res_{Cb}$ and $Res_{Cb}-Res_{Cr}$ instead of $Res_{Cb}$ and $Res_{Cr}$ can be coded (e.g., quantization followed by entropy-coding) when the two residual signals (e.g., Cb prediction residual signal and Cr prediction residual signal) are positively correlated. In another embodiment, the $Res_{Cb}$ and $Res_{Cb}+Res_{Cr}$ instead of $Res_{Cb}$ and $Res_{Cr}$ can be coded when the two residual signals are negatively correlated. In yet another embodiment, the $Res_{Cb}$ and $Res_{Cr}$ can be coded as usual when the two residual signals are neither negatively nor positively correlated.

In order to determine a type of correlation of the Cb component and the Cr component of the chroma prediction residual information, a threshold test of the calculated signal correlation of the two chroma channel prediction residuals (e.g., the Cb component and the Cr component) can be performed. In an embodiment, the sign (or type) of the correlation between the two chroma residual components (e.g., the Cb component and the Cr component) can be derived by using reconstructed or unquantized residual samples (e.g., points in a same point cloud) of a frame (or other coded units such as a video, a tile, or a slice) available both at an encoder and a decoder. In an embodiment, the sign of the correlation between the two chroma residual components can be derived by using the reconstructed or unquantized residual samples of the frame (or other units such as the video, the tile, or the slice) only at the encoder, and the derived sign of the correlation can further be signaled in the bitstream to decoder. In another embodiment, the sign of the correlation between the two chroma residual components can be derived by using the reconstructed or the unquantized residual samples from a previous LOD both at the encoder and the decoder. In another embodiment, the sign of the correlation between the two chroma residual components can be derived by using the reconstructed or unquantized residual samples from the previous LOD only at the encoder, and the derived sign of the correlation can further be signaled in the bitstream to the decoder.

In another embodiment, the sign of the correlation between the two chroma residual components can be derived by using the unquantized residual samples of a LOD to which the current point cloud pixel (or current point in the point cloud) belongs to at the encoder, and the derived sign of the correlation can further be signaled in the bitstream to the decoder. In another embodiment, the sign of the correlation between the two chroma residual components can be derived by using the reconstructed or the unquantized residual samples from N nearest-neighbor samples of the current point both at the encoder and the decoder, where N can be the number of prediction samples obtained as a result of the LOD generation and the nearest-neighbor search in the GPCC Test-Model design. In an exemplary embodiment of the present disclosure, the N can be set to 3 or 4.

The threshold used in the threshold tests can be adaptively adjusted depending on the signal characteristics and coding conditions. The threshold can be signaled in the bitstream. In an embodiment, the threshold can be set as a percentage of the number of pixels within the LOD mentioned above that have a positive per-pixel correlation. Accordingly, the threshold can be applied to determine the sign correlation in the coding process of the residual above is positive. Similarly, the threshold can be set as a percentage of the number of pixels within the LOD mentioned above that have a negative per-pixel correlation. Accordingly, the threshold can be applied to determine the sign correlation in the coding process of the residual above is negative.

In an embodiment, a global enabling signal can be sent in the bitstream to indicate whether the residual coding is enabled or to be used. The global enabling signal can be applied in a unit of coding, such as a video, a frame, a tile, or a slice.

When the global enabling signal indicates that the residual coding is to be used, a first binary flag can be sent to indicate if a correlation exists between a first chroma signal and a second chroma signal. If the first binary flag is set to be true (or a first value, or one), a second binary flag can be sent to indicate if the correlation is positive or negative. The first and second binary flags can be sent to each LOD in the G-PCC, for example. The threshold-test mentioned above can still be applied to determine the sign of the correlation (e.g., positive correlation or negative correlation).

An exemplary embodiment of the residual coding methods can be illustrated in a first C-like pseudo-code as follows:

```
if (inter_chroma_prediction_enabled_flag)
    for (i = 0; i < lodCount; i++) {
        if (decode(SignNonzero))
            SaveSign[i] = (decode(Sign) ? −1 : 1);
        else
            SaveSign[i] = 0;
    }
``` where inter_chromaprediction_enabled_flag can be the global enabling flag and decode(SignNonzero) can be the first binary flag. The first binary flag (e.g., decode(SignNonzero)) can provide, for each LOD at hand, a first bit signal to indicate whether a correlation exists. If the first binary flag (e.g., decode(SignNonzero)) is one (or a first value), a second binary flag (e.g., decode(Sign)) can provide a second bit signal to actually determine the sign of the correlation. For example, as shown in the above first C-like pseudo-code, when the second binary flag is one (or the first value), the sign of the correlation is −1 (or negative). When the second binary flag is zero (or a second value), the sign of the correlation is 1 (or positive). Further, if the first binary flag (e.g., decode(SignNonzero)) is zero (or the second value), the type of correlation is zero, which means no correlation exists between the first chroma signal and the second chroma signal. The sign of correlation for each point i can be stored in an array SaveSign[ ].

Further, a residual reconstruction process can be provided in a second C-like pseudo-code as follows:

```
reconstructedColor[1] = dequantize(ColorQuantizationIndex[1]);
    if (inter_chroma_prediction_enabled_flag)
        reconstructedColor[2] =
        dequantize(ColorQuantizationIndex[2]) +
            SaveSign[lod_counter] * reconstructedColor[1];
    else
        reconstructedColor[2] = dequantize(ColorQuantizationIndex[2]);
``` where reconsructedColor[1] and reconsructedColor[2] can be the first and the second chroma signals (or attribute values), respectively, and dequantize( ) can be an inverse-quantization process to output the reconstructed sample. As shown in the second C-like pseudo-code, the first chroma signal (e.g., reconsructedColor[1]) can be reconstructed based on a first inverse-quantization process on first chroma prediction residual information (e.g., ColorQuantizationIndex[1]). When the global enabling flag (e.g., inter_chromaprediction_enabled_flag) is one, the second chroma signal (e.g., reconstructedColor[2]) can be equal to a first portion and a second portion. The first portion can be obtained by performing a second inverse-quantization process on the second chroma prediction residual information (e.g., dequantize(ColorQuantizationIndex[2])), and the second portion can be obtained by multiplying the reconstructed first chroma information (e.g., reconsructedColor[1]) and the type of the correlation of the first chroma prediction residual information and the second chroma prediction residual information (e.g., SaveSign[lod_counter]). In addition, when the lobal enabling flag (e.g., inter_chromaprediction_enabled_flag) is zero (or the second value), the second chroma information (e.g., reconsructedColor[2]) can be reconstructed by performing the second inverse-quantization process on the second chroma prediction residual information (e.g., dequantize(ColorQuantizationIndex[2])).

It should be noted that the SaveSign[lod_counter] can be applied to reflect the sign-correlation that is determined for the (lod_count−1)-th LOD (e.g., LOD (N−1)) during the sample reconstruction.

In some embodiments, the methods mentioned above can be applied to other multi-channel signals where two channels are correlated in a $1^{st}$ order relation with zero offsets.

The above techniques can be implemented in a video encoder or decoder adapted for point cloud compression/decompression. The encoder/decoder can be implemented in hardware, software, or any combination thereof, and the software, if any, can be stored in on or more non-transitory computer readable media. For example, each of the methods (or embodiments), encoders, and decoders may be implemented by processing circuitry (e.g., one or more processors or one or more integrated circuits). In one example, the one or more processors execute a program that is stored in a non-transitory computer-readable medium.

Figure 11:
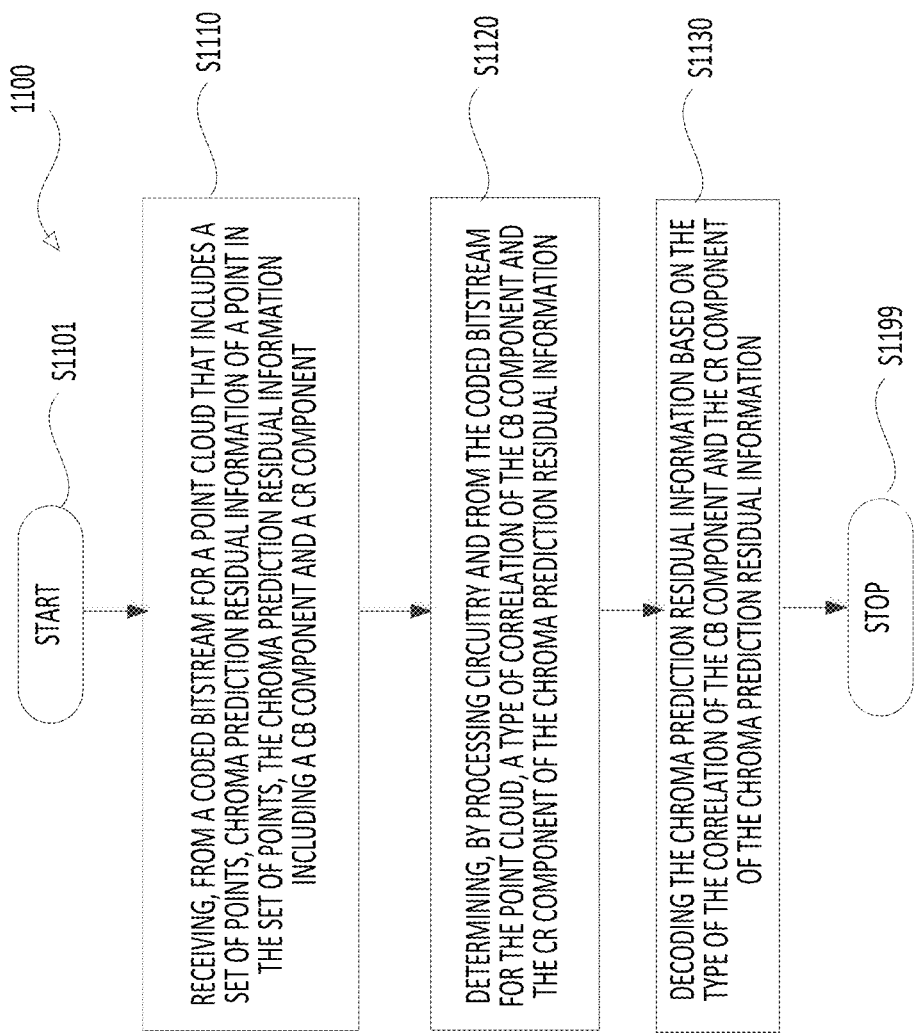
FIG. 11 shows a first flow chart outlining a first process example in accordance with some embodiments.
Figure 12:
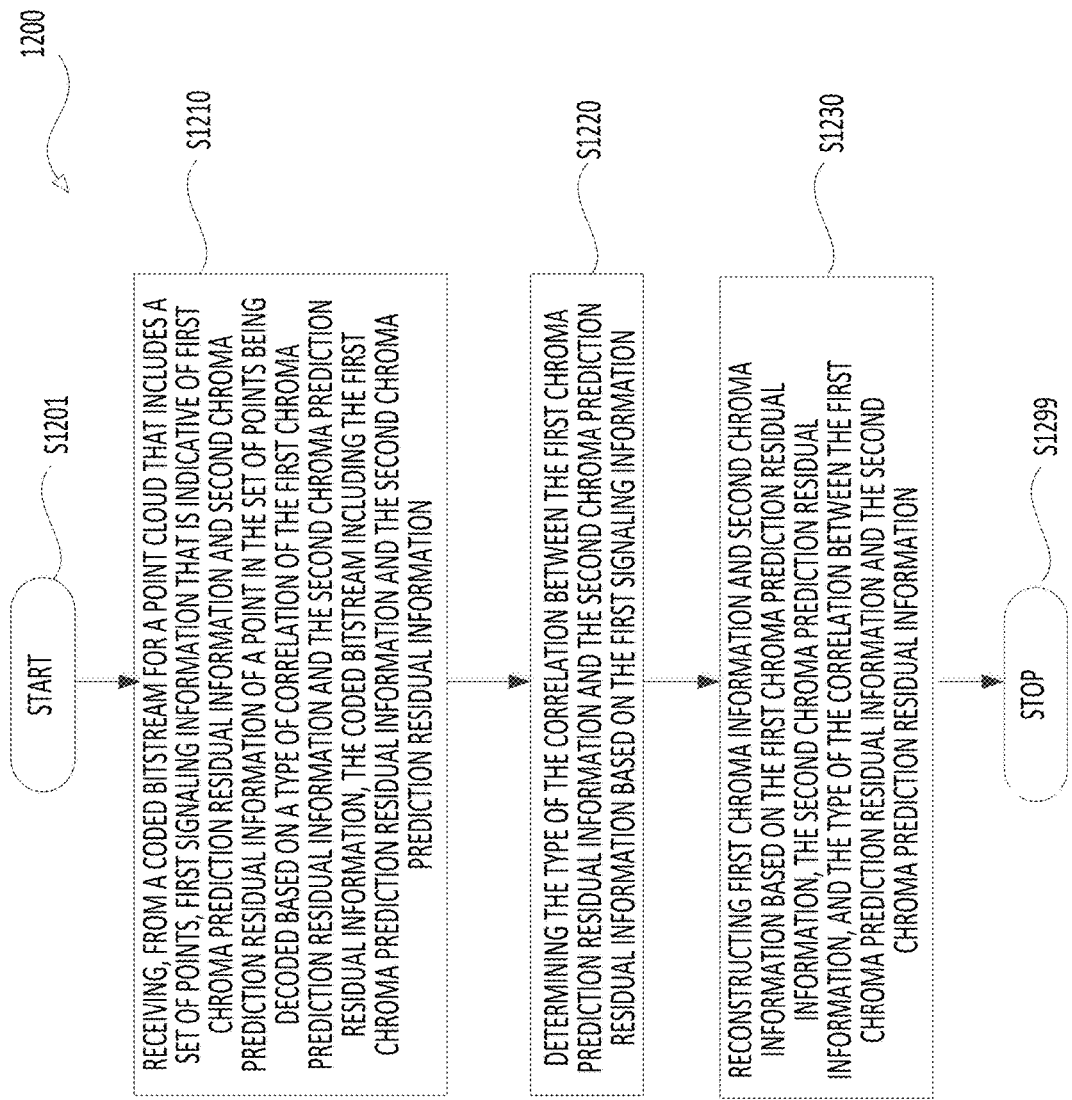
FIG. 12 shows a second flow chart outlining a second process example in accordance with some embodiments.

FIGS. 11 and 12 show flow charts outlining a process (1100) and a process (1200) according to embodiments of the disclosure. The processes (1100) and (1200) can be used during decoding processes for point clouds. In various embodiments, the processes (1100) and (1200) can be executed by processing circuitry, such as the processing circuitry in the terminal devices (110), the processing circuitry that performs functions of the encoder (203) and/or the decoder (201), the processing circuitry that performs functions of the encoder (300), the decoder (400), the encoder (700), and/or the decoder (800), and the like. In some embodiments, the processes (1100) and (1200) can be implemented in software instructions, thus when the processing circuitry executes the software instructions, the processing circuitry performs the processes (1100) and (1200) respectively.

As shown in FIG. 11, the process (1100) starts at (S1101) and proceeds to (S1110).

At (S1110), chroma prediction residual information of a point in a set of points can be received from a coded bitstream for a point cloud that includes the set of points. The chroma prediction residual information can include a Cb component and a Cr component.

At (S1120), a type of correlation of the Cb component and the Cr component of the chroma prediction residual information can be determined by processing circuitry and from the coded bitstream for the point cloud.

At (S1130), the chroma prediction residual information can be decoded based on the type of the correlation of the Cb component and the Cr component of the chroma prediction residual information.

In an example, in order to decode the chroma prediction residual information, the Cb component of the chroma prediction residual information and the Cb component minus the Cr component of the chroma prediction residual information can be decoded based on the type of the correlation of the Cb component and the Cr component being positive.

In another example, in order to decode the chroma prediction residual information, the Cb component of the chroma prediction residual information and the Cb component plus the Cr component of the chroma prediction residual information can be decoded based on the type of the correlation of the Cb component and the Cr component being negative.

In yet another example, in order to decode the chroma prediction residual information, the Cb component of the chroma prediction residual information and the Cr component of the chroma prediction residual information can be decoded based on no indicated correlation between the Cb component and the Cr component.

In some embodiments, the type of the correlation of the Cb component and the Cr component of the chroma prediction residual information can be determined to be positive based on a first number of residual points from one of a coded region, a previous level of detail (LOD), and N nearest-neighboring points of the point being positively correlated. In some embodiments, the type of the correlation of the Cb component and the Cr component of the chroma prediction residual information can be determined to be negative based on a second number of residual points from the one of the coded region, the previous LOD, and the N nearest-neighboring points of the point being negatively correlated.

In some embodiments, the coded region can include at least one of a frame, a video sequence, a group of pictures (GOP), a picture, a slice, or a tile.

In some embodiments, the N can be a positive integer that is equal to 3 or 4.

In the process (1100), the coded bitstream can further include signaling information that is indicative of the type of the correlation of the Cb component and the Cr component of the chroma prediction residual information. In an example, the signaling information can indicate the type of the correlation of the Cb component and the Cr component of the chroma prediction residual information is positive based on a first number of residual points from one of a coded region, a previous level of detail (LOD), a LOD to which the point belongs, or N nearest-neighboring points of the point being positively correlated. In another example, the signaling information can indicate the type of the correlation of the Cb component and the Cr component of the chroma prediction residual information is positive based on a second number of residual points from the one of the coded region, the previous LOD, the LOD to which the point belongs, or the N nearest-neighboring points of the point being negatively correlated.

As shown in FIG. 12, the process (1200) starts at (S1201) and proceeds to (S1210).

At (S1210), first signaling information can be received from a coded bitstream for a point cloud that includes a set of points. The first signaling information can indicate that first chroma prediction residual information and second chroma prediction residual information of a point in the set of points are decoded based on a type of correlation of the first chroma prediction residual information and the second chroma prediction residual information. The coded bitstream can include the first chroma prediction residual information and the second chroma prediction residual information.

At (S1220), the type of the correlation between the first chroma prediction residual information and the second chroma prediction residual information can be determined based on the first signaling information.

At (S1230), first chroma information and second chroma information can be reconstructed based on the first chroma prediction residual information, the second chroma prediction residual information, and the type of the correlation between the first chroma prediction residual information and the second chroma prediction residual information.

In some embodiments, second signaling information can be determined based on the first signaling information being a first value. The second signaling information can indicate that the type of the correlation between the first chroma prediction residual information and the second chroma prediction residual information are determined by third signaling information. The third signaling information can be determined based on the second signaling information being the first value. The type of the correlation between the first chroma prediction residual information and the second chroma prediction residual information can be determined based on the third signaling information.

In an example, the type of the correlation between the first chroma prediction residual information and the second chroma prediction residual information can be determined to be negative based on the third signaling information being the first value. In another example, the type of the correlation between the first chroma prediction residual information and the second chroma prediction residual information can be determined to be positive based on the third signaling information being a second value.

In the process (1200), the first chroma information can be reconstructed by performing a first inverse-quantization process on the first chroma prediction residual information. In addition, in response to the first signaling information being a first value, the second chroma information that includes a first portion and a second portion can be reconstructed. The first portion can be obtained by performing a second inverse-quantization process on the second chroma prediction residual information, and the second portion can be obtained by multiplying the reconstructed first chroma information and the type of the correlation of the first chroma prediction residual information and the second chroma prediction residual information.

In some embodiments, the first chroma information can be reconstructed by performing a first inverse-quantization process on the first chroma prediction residual information. In response to the first signaling information being a second value, the second chroma information can be reconstructed by performing a second inverse-quantization process on the second chroma prediction residual information.

In some embodiments, the first chroma prediction residual information and the second chroma prediction residual information can be correlated in a first order relation with zero offsets.

As noted above, techniques described above can be implemented as computer software using computer-readable instructions and physically stored in one or more computer-readable media. For example, FIG. 13 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
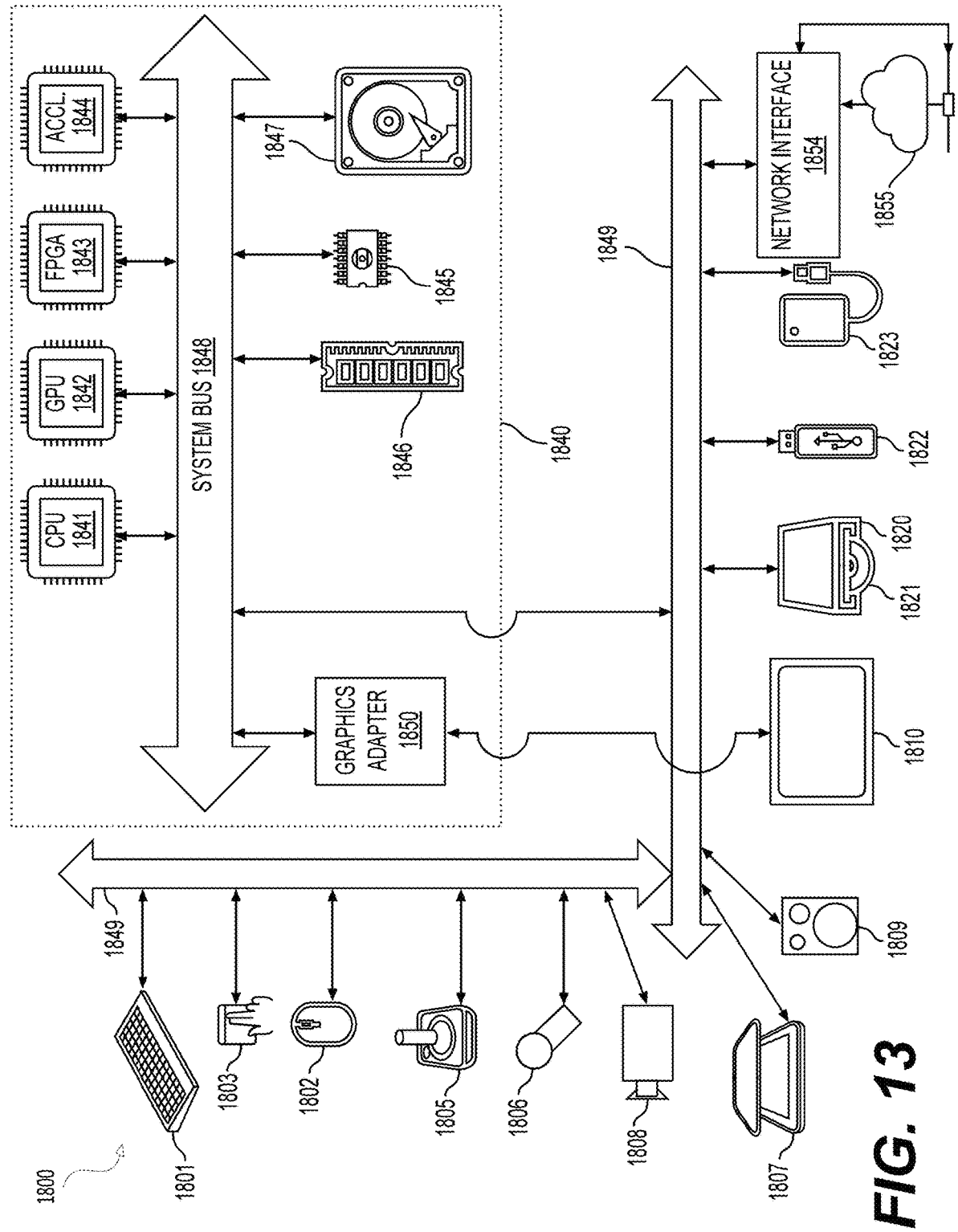
FIG. 13 is a schematic illustration of a computer system in accordance with an embodiment.

The components shown in FIG. 13 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hard-wired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of point cloud geometry decoding in a point cloud decoder, comprising:

receiving, from a coded bitstream for a point cloud that includes a set of points, chroma prediction residual information of a point in the set of points, the chroma prediction residual information including a Cb component and a Cr component;

determining, by processing circuitry and from the coded bitstream for the point cloud, a type of correlation from among a plurality of correlation types between the Cb component and the Cr component of the chroma prediction residual information; and decoding the chroma prediction residual information based on the determined type of the correlation from among the plurality of correlation types between the Cb component and the Cr component of the chroma prediction residual information.

2. The method of claim 1, wherein the decoding comprises:

decoding the Cb component of the chroma prediction residual information and the Cb component minus the Cr component of the chroma prediction residual information based on the determined type of the correlation from among the plurality of correlation types between the Cb component and the Cr component being positive.

3. The method of claim 1, wherein the decoding comprises:

decoding the Cb component of the chroma prediction residual information and the Cb component plus the Cr component of the chroma prediction residual information based on the determined type of the correlation from among the plurality of correlation types between the Cb component and the Cr component being negative.

4. The method of claim 1, wherein the decoding comprises:

decoding the Cb component of the chroma prediction residual information and the Cr component of the chroma prediction residual information based on no indicated correlation between the Cb component and the Cr component.

5. The method of claim 1, wherein the determining comprises:

determining the type of the correlation from among the plurality of correlation types between the Cb component and the Cr component of the chroma prediction residual information is positive based on a first number of residual points from one of a coded region, a previous level of detail (LOD), or N nearest-neighboring points of the point being positively correlated; and determining the type of the correlation from among the plurality of correlation types between the Cb component and the Cr component of the chroma prediction residual information is negative based on a second number of residual points from the one of the coded region, the previous LOD, or the N nearest-neighboring points of the point being negatively correlated.

6. The method of claim 5, wherein the coded region comprises at least one of a frame, a video sequence, a group of pictures (GOP), a picture, a slice, or a tile.

7. The method of claim 5, wherein the N is a positive integer that is equal to 3 or 4.

8. The method of claim 1, wherein the coded bitstream includes signaling information that is indicative of the type of the correlation from among the plurality of correlation types between the Cb component and the Cr component of the chroma prediction residual information, the signaling information indicating the type of the correlation from among the plurality of correlation types between the Cb component and the Cr component of the chroma prediction residual information is positive based on a first number of residual points from one of a coded region, a previous level of detail (LOD), a LOD to which the point belongs, and N nearest-neighboring points of the point being positively correlated, and the signaling information indicating the type of the correlation from among the plurality of correlation types between the Cb component and the Cr component of the chroma prediction residual information is negative based on a second number of residual points from the one of the coded region, the previous LOD. the LOD to which the point belongs, and the N nearest-neighboring points of the point being negatively correlated.

9. A method of point cloud geometry decoding in a point cloud decoder, comprising:

receiving, from a coded bitstream for a point cloud that includes a set of points, first signaling information that indicates first chroma prediction residual information and second chroma prediction residual information of a point in the set of points is decoded based on a type of correlation from among a plurality of correlation types between the first chroma prediction residual information and the second chroma prediction residual information, the coded bitstream including the first chroma prediction residual information and the second chroma prediction residual information;

determining the type of the correlation from among the plurality of correlation types between the first chroma prediction residual information and the second chroma prediction residual information based on the first signaling information; and reconstructing first chroma information and second chroma information based on the first chroma prediction residual information, the second chroma prediction residual information, and the determined type of the correlation from among the plurality of correlation types between the first chroma prediction residual information and the second chroma prediction residual information.

10. The method of claim 9, wherein the determining further comprises:

determining second signaling information based on the first signaling information being a first value, the second signaling information indicating that the type of the correlation from among the plurality of correlation types between the first chroma prediction residual information and the second chroma prediction residual information is indicated by third signaling information;

determining the third signaling information based on the second signaling information being the first value, the third signaling information indicating the type of the correlation from among the plurality of correlation types between the first chroma prediction residual nation and the second chroma prediction residual information; and determining the type of the correlation from among the plurality of correlation types between the first chroma prediction residual information and the second chroma prediction residual information based on the third signaling information.

11. The method of claim 10, wherein the determining the type of the correlation further comprises:

determining the type of the correlation from among the plurality of correlation types between the first chroma prediction residual information and the second chroma prediction residual information is negative based on the third signaling information being the first value; and determining the type of the correlation from among the plurality of correlation types between the first chroma prediction residual information and the second chroma prediction residual information is positive based on the third signaling information being a second value.

12. The method of claim 9, wherein the reconstructing further comprises:

reconstructing the first chroma information by performing a first inverse-quantization process on the first chroma prediction residual information; and in response to the first signaling information being a first value, reconstructing the second chroma information that includes a first portion and a second portion, wherein:

the first portion is obtained by performing a second inverse-quantization process on the second chroma prediction residual information, and the second portion is obtained by multiplying the reconstructed first chroma information and the type of the correlation from among the plurality of correlation types between the first chroma prediction residual information and the second chroma prediction residual information.

13. The method of claim 9, wherein the reconstructing further comprises:

reconstructing the first chroma information by performing a first inverse-quantization process on the first chroma prediction residual information; and in response to the first signaling information being a second value, reconstructing the second chroma information by performing a second inverse-quantization process on the second chroma prediction residual information.

14. The method of claim 8, wherein the first chroma prediction residual information and the second chroma prediction residual information are correlated in a first order relation with zero offsets.

15. An apparatus of processing point cloud data, comprising:

processing circuitry configured to:

receive, from a coded bitstream for a point cloud that includes a set of points, chroma prediction residual information of a point in the set of points, the chroma prediction residual information including a Cb component and a Cr component;

determine, from the coded bitstream for the point cloud, a type of correlation from among a plurality of correlation types between the Cb component and the Cr component of the chroma prediction residual information; and decode the chroma prediction residual information based on the determined type of the correlation from among the plurality of correlation types between the Cb component and the Cr component of the chroma prediction residual information.

16. The apparatus of claim 15, wherein the processing circuitry is further configured to:

decode the Cb component of the chroma prediction residual information and the Cb component minus the Cr component of the chroma prediction residual information based on the determined type of the correlation from among the plurality of correlation types between the Cb component and the Cr component being positive.

17. The apparatus of claim 15, wherein the processing circuitry is further configured to:

decode the Cb component of the chroma prediction residual information and the Cb component plus the Cr component of the chroma prediction residual information based on the determined type of the correlation from among the plurality of correlation types between the Cb component and the Cr component being negative.

18. The apparatus of claim 15, wherein the processing circuitry is further configured to:

decode the Cb component of the chroma prediction residual information and the Cr component of the chroma prediction residual information based on no indicated correlation between the Cb component and the Cr component.

19. The apparatus of claim 15, wherein the processing circuitry is further configured to:

determined the type of the correlation from among the plurality of correlation types between the Cb component and the Cr component of the chroma prediction residual information is positive based on a first number of residual points from one of a coded region, a previous level of detail (LOD), or N nearest-neighboring points of the point being positively correlated; and determine the type of the correlation from among the plurality of correlation types between the Cb component and the Cr component of the chroma prediction residual information is negative based on a second number of residual points from the one of the coded region, the previous LOD, or the N nearest-neighboring points of the point being negatively correlated.

20. The apparatus of claim 15, wherein the coded bitstream includes signaling information that is indicative of the type of the correlation from among the plurality of correlation types between the Cb component and the Cr component of the chroma prediction residual information, the signaling information indicating the type of the correlation from among the plurality of correlation types between the Cb component and the Cr component of the chroma prediction residual information is positive based on a first number of residual points from one of a coded region, a previous level of detail (LOD), a LOD to which the point belongs, and N nearest-neighboring points of the point being positively correlated, and the signaling information indicating the type of the correlation from among the plurality of correlation types between the Cb component and the Cr component of the chroma prediction residual information is negative based on a second number of residual points from the one of the coded region, the previous LOD, the LOD to which the point belongs, and the N nearest-neighboring points of the point being negatively correlated.

* * * * *